Sept. 28, 1926.

A. J. NELSON 1,601,408

TEMPERATURE CONTROLLER

Filed Nov. 13, 1922   3 Sheets-Sheet 1

Fig.1

Inventor:
Albin J. Nelson,
By Fisher Towle Clapp + Soans
attys

Sept. 28, 1926.

A. J. NELSON 1,601,408

TEMPERATURE CONTROLLER

Filed Nov. 13, 1922  3 Sheets-Sheet 2

Inventor:
Albin J. Nelson,
By Fisher Towle Clapp & Soans
attys.

Sept. 28, 1926.                     A. J. NELSON                     1,601,408
                              TEMPERATURE CONTROLLER
                              Filed Nov. 13, 1922           3 Sheets-Sheet 3
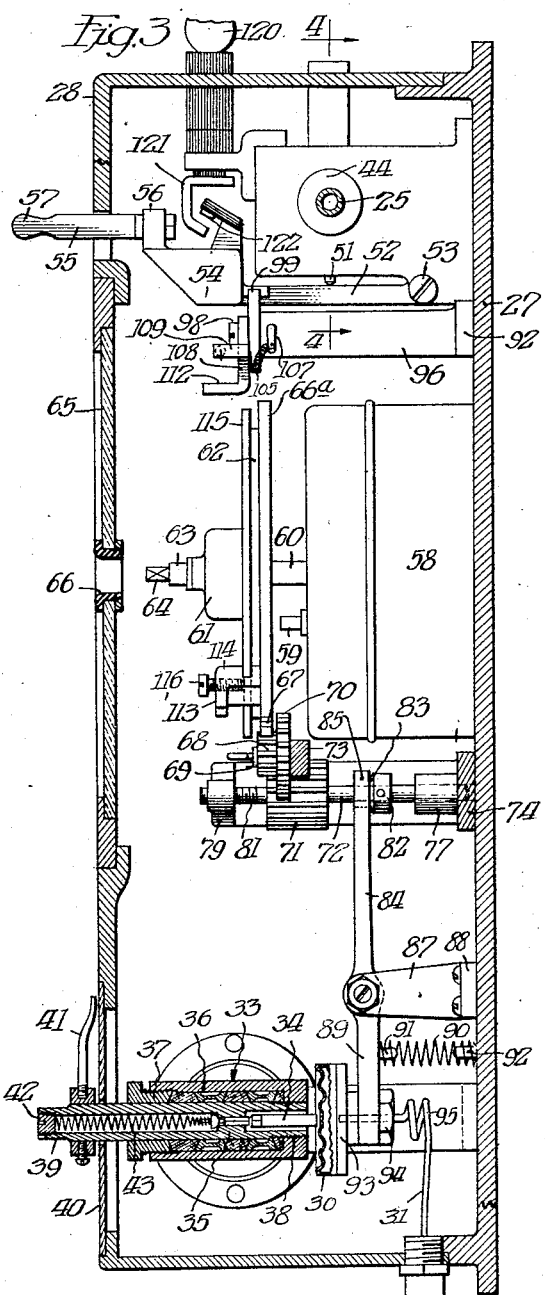
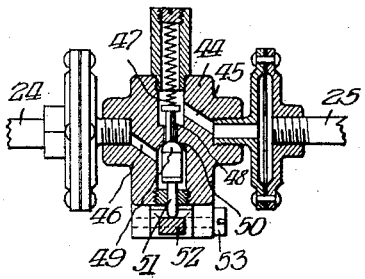
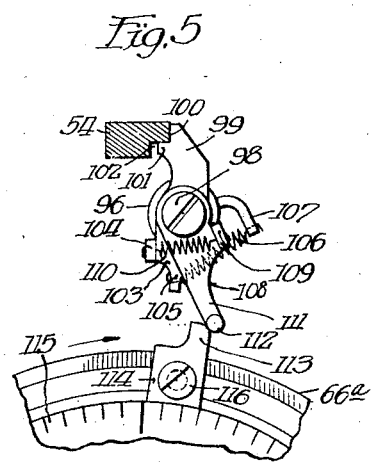
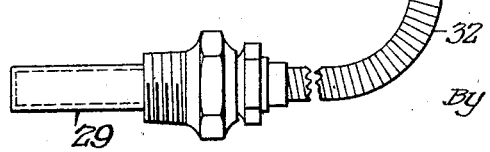
Inventor:
Albin J. Nelson,
By Fisher Towle Clapp & Sonns
Attys.

Patented Sept. 28, 1926.

1,601,408

UNITED STATES PATENT OFFICE.

ALBIN J. NELSON, OF EAU CLAIRE, WISCONSIN, ASSIGNOR TO TOWER MANUFACTURING CO. INC., OF NEW YORK, N. Y., A CORPORATION OF NEW YORK.

TEMPERATURE CONTROLLER.

Application filed November 13, 1922. Serial No. 600,778.

My invention relates to improvements in temperature controllers and relates particularly to means for automatically stabilizing and varying, according to a predetermined plan or program, the temperature or pressure of a body of fluid, for instance the temperature of a vulcanizing chamber, although certain phases of the invention are capable of more extended application to automatic controlling apparatus in general.

In many industrial processes which are carried by the aid of heat or pressure, it is, in certain instances in vulcanizing rubber goods, quite desirable that the temperature of the process should be regulated according to a predetermined program. For example, in the vulcanizing of rubber goods, certain methods of cure demand a temperature or steam pressure which should be raised gradually during the initial stage of the cure and maintained at a maximum for another period of time until the cure is completed, whereupon the application of heat should be preferably at once discontinued in order to prevent the risk of overcuring the goods, or, it may be that another process of curing requires that the temperature be raised gradually for a certain period, held at a given degree for another period, then raised gradually during a further period after which follows an interval of sustained constant temperature prior to the shut-off of the supply of heat. My invention is particularly well adapted for automatically effecting the control of heat in such processes according to a plan or program previously determined.

Hence, the principal objects of the invention are to provide an arrangement or apparatus by means of which the temperature or pressure of a body of fluid or other medium may be automatically and accurately controlled according to a predetermined program; to provide means for positively and rapidly terminating the application of heat or pressure after the desired interval of time has elapsed; to provide an apparatus of the character referred to in which the program may be readily varied as desired; to provide an apparatus of the character referred to in which the setting, adjustment or manipulation of the regulating apparatus may be positively, accurately, rapidly and conveniently effected; to provide an apparatus of the character referred to which shall be substantially fool-proof in operation; to provide a construction which shall be simple and economical in design and to manufacture, while being rugged and reliable in service and inexpensive to operate and maintain, and in general to provide an improved and efficient construction of the character referred to.

In the drawings, I have illustrated my invention as applied to an apparatus for controlling the temperature of a vulcanizer according to a predetermined program. In said drawings, Fig. 1 is an elevation of the apparatus showing the general arrangement and connections.

Fig. 3 is a section taken on the line 3—3 of Fig. 2.

Fig. 4 is a section taken on the line 4—4 of Fig. 3.

Fig. 5 is an enlargement of a portion of Fig. 2, showing the automatic trip but with the parts in a position different from that shown in Fig. 2.

Figure 2:
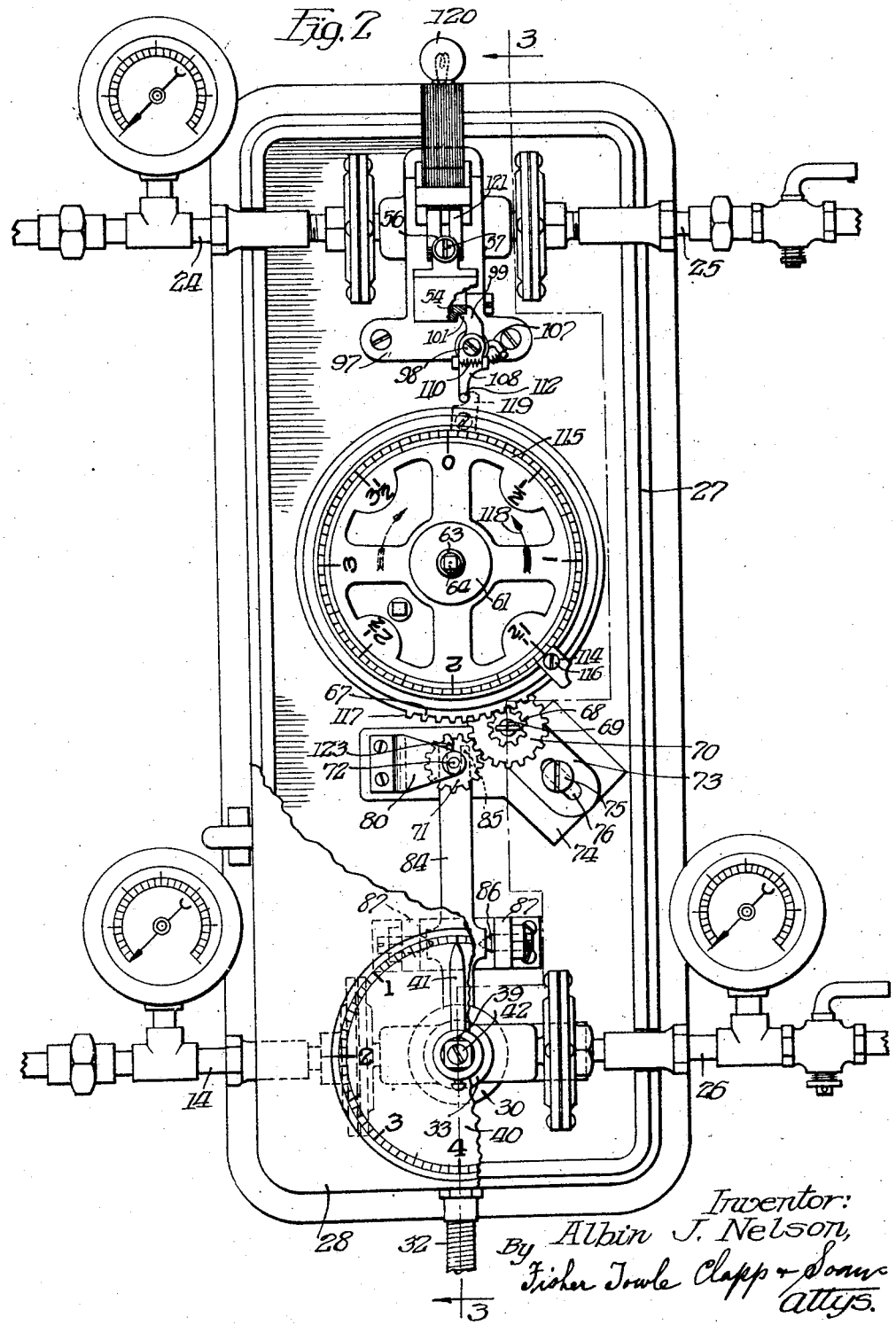
Fig. 2 is an enlargement of the controlling apparatus shown in Fig. 1.

In Fig. 1, 10 represents the tank or other receptacle in which the vulcanizing or other process is carried on by the aid of steam admitted to the tank 10 through the pipe 11 which is connected to a source of live steam. The inlet valve 12 which is interposed in the steam line 11 is controlled by a double diaphragm valve 13 of the type in which air pressure admitted to said valve 13 through the pipe 14 or through the pipe 15 will close such valve 12 and thus shut off the further supply of steam. A spring 16, surrounding the stem of valve 12 in the usual manner serves to open the valve 12 when permitted to do so by an absence of, or deficiency in, pressure in pipes 14 and 15.

An exhaust pipe 18 serves to discharge the steam from the vulcanizing chamber or tank 10 when the valve 19 is opened. Said valve 19 is normally closed by means of a spring 20 surrounding the valve stem 21 and is adapted to be opened by a reverse diaphragm valve 22 when the pipe 23 is supplied with air under pressure. Pipes 23 and 15 are connected in multiple to the main shut-off line 24 which leads from the cut-off valve mechanism, while the pipe 14 is connected to the stabilizing valve mechanism at the lower end of the controller. The cut-off valve mechanism and the stabilizing valve mechanism are respectively supplied with air under suitable pressure admitted to the respective inlet pipes 25 and 26.

The controlling apparatus is, as to its principal operating parts, mounted upon a suitable back board or plate 27 and is enclosed in an outer casing 28 through the front of which the several adjustments may be effected.

For a description of the principal operating parts of the stabilizing valve mechanism, reference may be had to my previous United States Letters Patent No. 1,175,171. As in said patent, the numeral 29 indicates a bulb element which is inserted into the vulcanizing chamber and is connected to the expansible sealed capsule 30 by means of a small tube 31. Between the point where the said tube 31 enters the casing and where it enters the socket of the bulb element 29, the tube 31 is protected against breakage or damage by means of a jacket or tubular armored casing 32. The bulb 29 contains a small quantity of fluid of such composition as to cause the desired expansive movement of the capsule 30 between the prescribed limits or range for which the apparatus is designed.

The capsule 30 is interposed between a pair of relatively movable members or abutments, one of which comprises a stabilizing valve 33 in connection with which the expansion or contraction of the capsule 30 controls the pressure in line 14 and hence the temperature of the steam in the vulcanizer. while the other member or abutment is normally stationary, but may be moved toward or from the valve mechanism 33 by a time-controlled mechanism according to a desired program. The valve mechanism 33 may be of any desired type, is not claimed herein specifically, and in view of the fact that it is particularly described and set forth in the patent above mentioned, it is, perhaps, unnecessary to describe same in detail. It is sufficient to state that when the plunger 34 is engaged by the movable diaphragm of the capsule 30 and pushed outwardly toward the front of the apparatus, communication is established between the air pressure line 26 and the pipe 14 which actuates the diaphragm valve 13 and hence shuts off or throttles steam flowing into the chamber 10 through pipe 11. It will be observed that the body 35, in which are formed valve passages and which carries the valve actuated by plunger 34, is mounted within an outer tubular casing 36 fixed to the frame of the apparatus. The front end of the cylindrical valve body 35 is rotatable in, and slidable through a gland 37 screwed into the outer end of the casing 36, while the inner end of the valve body 35 is threaded into the bottom of the casing as indicated at 38. Such threaded engagement allows the valve body 35 to be moved toward or away from the capsule 30 by means of a key or wrench applied to the square end 39 of the valve body which extends through the front plate or dial 40. A pointer 41 fixed on the end of the valve body 35 serves to indicate the temperature for which the stabilizing valve is set. The numeral 42 represents merely a closure or plug screwed into the end of the valve body 35 and, besides furnishing an abutment for the valve spring 43, enables the valve parts to be withdrawn and repaired or cleaned by merely unscrewing the said plug.

The cut-off valve mechanism which is illustrated in section in Fig. 4, comprises a stationary valve casing 44 having inlet and outlet passages 45 and 46 formed therein and respectively communicating with the air pressure line 25 and the pipe 24. The passage 45 communicates with an air pocket 47 in the bottom of which is drilled a vertical bore through which slides the loosely fitting stem 48 of the valve 49. Said valve 49 normally is pressed up again its seat 50 by means of a plunger 51, the lower end of which is forced upwardly by the arm or lever 52, the rear end of which is pivoted on a horizontally extending stationary pin 53. The front end of said lever 52 is enlarged as shown at 54 to form a weight which serves to swing the lever 52 downwardly when permitted to do so by the latch mechanism. Through the front of the casing 28 there extends a small pin 55, the inner end of which is secured in a lug 56 on the end of the lever 54, while the outer end 57 is rounded to facilitate handling by the finger of the operator.

The adjustment of the thermostatic or stabilizing valve mechanism and also the cut-off valve mechanism, that is to say, the latch, are both operated or controlled by a single clock mechanism, and by the word clock I intend to include all devices having a continuous or substantially continuous movement, the extent of which movement is governed by time. In its most convenient form, said time motor or clock comprises a suitable prime mover, such as a clock spring, suitable gears and also an escapement, all contained within a case 58 attached to the backboard 27 of the controlling apparatus casing. Out of said clock case 58 extends the square end of the swinging spindle 59 by means of which the spring may be wound from time to time, as it becomes relaxed by use, and also a main spindle 60, one revolution of which preferably requires a somewhat greater length of time than the maximum period for which the apparatus is designed. In the present case, the shaft 60 is arranged to make a complete revolution once in four hours.

The end of the shaft 60 is equipped with the usual clutch mechanism through which said shaft 60 drives the hub 61, and to said hub 61 there are rigidly secured a dial wheel 62 and a short central pin 63 having its ends squared as at 64 to receive a suitable key by means of which the mechanism can be set back to normal or starting position when the operation or process is about to commence. In order to permit a proper view of the dial wheel 62 and associated parts, the front of the casing is fitted with a glazing as at 65, a centrally bored aperture 66 being provided in said glazing 65 to permit access to the said shaft 64.

To the dial wheel 62 there is rigidly secured an annular rim 66$^a$, which, as shown in Fig. 2, is made with a set of teeth 67 said wheel thus forming in effect a segmental or mutilated gear. Said gear teeth 67 are designed, at the correct period in the rotation of the dial wheel 62, to mesh with the teeth of a small spur pinion 68 mounted to rotate on a stationary shaft or arbor 69. Secured to the pinion 68 and adapted to rotate therewith is a somewhat larger spur gear 70 which is arranged to mesh directly with a small spur gear 71 of wide face, keyed on shaft 72.

The gear 71 is preferably standardized for all types of controllers, while the gears 68 and 70, which transfer the movement of gear teeth 67 to spur gears 71, may be varied to increase or lessen the speed ratio of the gearing. To this end the stub shaft 69 is carried in a small angular bracket 73 having slidable and rotatable movement on the main bracket 74. A cap bolt or screw 75, passing through slot 76 in small bracket 73 enables the gears to be clamped in proper position so as to mesh correctly.

The shaft 72 is arranged to rotate in a pair of aligned bosses, the rear boss 77 being formed of the base bracket 74 while the outer boss 79 is formed on the end of a small bracket or arm 80. The shaft 72, in addition to the rotary movement, may also slide in the boss 77, such sliding movement being positively controlled and determined by a thread or a plurality of threads 81 formed on the outer end of said shaft 72 and fitting corresponding internal threads in lug 79, said lug 79 constituting in effect a nut for the threaded end of shaft 72. Said threads 81 may be single, double, triple, etc., depending upon the speed ratio of the gearing in connection with the rate of sliding movement desired for shaft 72. The gear 71, having a very wide face, remains in proper mesh with the gear 70 within the range of the sliding movement of the shaft 72.

There is secured on the slidable and rotatable shaft 72 a fixed collar 82, the outer face of which is rounded off as shown at 83 in order properly to abuttingly engage the upper end of a lever 84. As shown best in Fig. 2, said upper end of the lever 84 is forked as indicated at 85 to straddle the shaft 72. Said lever 84 is pivotally mounted on a horizontal axis at right angles to the axis of the shaft 72, and such mounting, in order to eliminate, so far as possible, the effect of friction, comprises a pair of suitably opposed cone centers as at 86 adjustably secured in a pair of spaced lugs 87 extending from the base of a small bracket 88 mounted on the back board 27 of the apparatus. The lower end 89 of said lever 84 is normally forced outwardly by means of a coiled compression spring 90 interposed between the lever end 89 and the back board 27 and held in place by a pair of positioning pins 91 and 92 respectively fixed in said part 89 and the back board 27. Said spring 90 is of such strength so as to insure that the upper end of lever 84 will always be pressed inwardly with its bifurcated end resting against and positively engaging the rounded face of collar 82.

The lower end 89 of said lever 84 serves as a support for the expansible capsule 30 heretofore referred to. The back or base bar 93 of said capsule is rigidly secured to the lower end of said lever by means of a suitable lock nut 94. In order to permit movement of the capsule with the lower end of said actuating lever, the tube 31, which connects the bulb with the capsule is made with a plurality of spirals or coils 95 providing a sufficient amount of elasticity in the connection to present interference with said movement. This completes the detailed description of the mechanism by which the temperature may be varied according to lapse of time. I will now complete the description of the mechanism by which the application of heat is arrested when the cure is completed.

The lever 52, which maintains the valve 49 in such position as to permit the supply of steam to the heating tank 10, is maintained in such elevated position by a latch mechanism which is controlled by the clock. Referring to Figs. 2 and 5, it will be observed that there is a post 96 projecting outwardly from the bracket 97 which carries the valve housing 44 and in the outer end of said post 96 there is fixed a pivot pin 98. Said pin 98 constitutes a pivot for the latch member 99 which is in the form of a lever having its upper end notched out as indicated at 100 to form a shoulder or abutment 101 normally engaging in a notch 102 of the valve lever 54 and thus maintaining same in latched position. The latch member 99 is made with a lower extension 103 on which there is formed an outstanding lug 104. On said extension 103 there is also made a small tail 105 connected by means of a coiled tension spring 106 to the end of a stationary pin or hook 107 fixed on the side of supporting post 96. Hence spring 106 constantly tends to swing latch 99 into the position shown in Fig. 5 so as to support the valve lever 54.

There is also mounted to oscillate upon the pivot pin 98 an auxiliary arm or lever 108 coaxial with the latch 99 and overlying the tail portion 103 of said latch 99. Said arm 108 is made with an outturned lug 109 which is connected to the lug 104 of latch 99 by means of a small coiled tension spring 110 which spring normally draws the arm 108 to the left of Fig. 5 so that the left hand edge of the arm 108 engages the lug 104 of latch 99, said lug 104 thus operating as a stop or abutment to compel the latch arm 99 to move with the arm 108 when said arm is moving toward the left in clockwise direction. When the arm 108 is moved in the other direction, the spring 110 merely expands while the latch 99 remains stationary by reason of its upper end engaging against the side of the valve lever 54.

On the lower end of the arm 108 is a depending finger or extension 111 on the end of which is fixed a pin 112 so positioned as to lie in the path of movement of a small dog or cam 113 projecting from a trip block 114 secured to the periphery of the dial 115 of the wheel 62. As shown best in Figs. 3 and 5, said block 114 is milled out to fit over the edge of the dial 115 and is secured in place thereon in any desired position by means of a set screw 116.

In view of the above description of the detials of the arrangement, the operation of same may be readily explained.

In the example illustrated, Fig. 2 shows the position of the parts after the clock has been wound up and with the parts in the position occupied at the commencement of the process. It will be seen that the trip block 114 has been set at the graduation mark 1½, the total time during which heating fluid is to be supplied, being in this instance 1½ hours. It will also be observed that the zero on the dial scale is vertically above the axis of the dial and that the gear or pinion 69 meshes with the mutilated gear 67 at a point spaced from the termination 117 of said gear a distance corresponding to one-half hour on the scale. This is for the purpose of providing a gradual temperature rise during the first half hour of the process.

By reason of the latch 99 holding up the valve lever 54, the passage of compressed air from the air line 25 to the pipe 24 and diaphragm valve 22 is prevented, and hence, the blow-off valve 19, which is of the reverse action type is closed, permitting the vulcanizing receptacle or tank 10 to fill up with steam entering through valve 12.

When the steam is first turned into pipe 11 at the commencement of the operation, the bulb 29, being cold, the volatile fluid therein contained is ineffective to expand the capsule 30 and hence the thermostatically-controlled valve remains closed, preventing compressed air from flowing from air line 26 into pipe 14. Thus the diaphragm valve 13 is not actuated and the admission valve 12 remains open. As soon as the steam flowing into the tank 10 heats up the bulb 29 to the predetermined starting temperature for which the thermostatic valve has been set, for example 250° F. the capsule 30 expands and opens said valve against action of spring 43, permitting air under pressure to flow from the air line 26 into pipe 14, thus actuating the diaphragm valve 13 and closing, or partially closing the steam valve 12. Hence, the temperature of the tank, at the commencement of the operation, will be maintained at 250°, which temperature would remain constant if it were not for the fact that during the first half hour of the process, the capsule 30 is being gradually moved away from the thermostatic valve, thereby compelling the capsule 30 to expand more and more before it can actuate the thermostatic valve. Said greater expansion of the capsule 30 obviously demands a greater pressure of the volatile fluid in bulb 29, and hence a higher temperature in receptacle 10, therefore the temperature in said receptacle 10 gradually rises. The gradual movement of the capsule away from the thermostatic valve is effected as follows. When the dial wheel 62 commences to revolve in the direction of the arrow 118, the mutilated gear 67 turns pinion 68 and with the latter pinion 70, which pinion 70 rotates gear 71 on shaft 72. The rotation of shaft 72, by reason of the threads 81 turning in the threaded lug 79, causes the shaft 72 to move outwardly, rocking lever 84 in an anti-clockwise direction, (see Fig. 3) and thus moving the capsule 30 away from the thermostatic valve.

After the lapse of 30 minutes time, the mutilated gear 67 has been rotated into such position that its final tooth 117 passes out of mesh with pinion 69 and no further bodily movement of the capsule 30 takes place. Hence the temperature thereafter during the remainder of the heating process is maintained constant. It will be manifest that the final temperature to which the tank has gradually been raised during the first 30 minutes of the process can be varied by changing the pitch of the treads 81 on shaft 72, the number of teeth in pinion 68 or the number of teeth in pinion 70. Also the length of the period during which the temperature is being gradually elevated may be varied by lengthening or shortening the effective arc of the mutilated gear 67. Also, if desired, the apparatus can be arranged for an initial rise of temperature, an interval of constant temperature and a further rise in temperature by providing a second segmental gear separated from the first segmental gear 67 by a blank space. Other variations or adjustments will readily occur to those skilled in the art.

I stated that the apparatus is set for a heating period of 1½ hours. At the end of such period the trip lock 114 has been rotated into the final position shown in dotted lines at 119 in Fig. 2, the lug 113 then striking the pin 112 and rocking arm 108 in clockwise direction. Hence latch 99 will be tripped permitting lever 54 to descend and allow the valve 49 to open. Air pressure will then flow from air line 25 into pipe 24 and, as previously described, this will result in the closing of the steam valve 12 and opening of the blow-off valve 19.

If desired, the descent of the lever 54, by reason of the termination of the process, can be announced by a signal lamp 120, the circuit of which is closed by a set of contacts 121 and 122.

After the latch has been tripped by dog 113, the dial wheel continues its movement under the influence of the clock until the further rotation of the latter is prevented by any desired means, such as a stop or a brake, as is well understood by those skilled in the art. When the apparatus is reset, the lug 113 is enabled to wipe past the pin 112 by reason of spring 109 permitting independent rotary movement of the arm 108 and latch 99 as shown in Fig. 5.

In order to insure against a slip in the mesh of pinion 68 and mutilated gear 67 for any cause, I prefer to place a mark 123 on the front side of pinion 71, which mark should assume a definite position, in this instance vertical, when the apparatus is set back to zero at the commencement of the process. However, many thousands of tests have demonstrated that there is no danger of such an occurrence, if the apparatus is handled with ordinary care.

The described details of construction and operation being merely illustrative of a single phase of my invention, the scope of same should be determined by reference to the appended claims, said claims being construed as broadly as possible, consistent with the state of the art.

I claim as my invention:

1. In controlling apparatus, the combination of an expansible motor element responsive to changes in the condition of a body of fluid, a pair of relatively movable members between which said motor element is interposed, means controlled by movement of one of said members for stabilizing said condition, a time-controlled motor, and a toothed gear train driven by said motor during a portion only of its movement for effecting relative movement of said members, thereby to vary said condition.

2. In controlling apparatus, the combination of a capsule expansible by rise of temperature in a body of fluid, a pair of relatively movable members between which said capsule is interposed, means controlled by movement of one of said members for controlling said temperature, a clock, and a toothed gear driven by said clock during a portion only of its movement for effecting relative movement of said members, thereby to effect a substantially uniform and gradual change in said temperature during said gear-actuated movement.

3. In apparatus for controlling temperature or pressure according to a predetermined program, the combination of means for controlling the condition of a body of fluid, a clock, mechanism including a gear train having a mutilated gear, a shiftable shaft actuated thereby, and a thermostatic valve release actuated by the movement of said clock for effecting a positive and gradual change during a portion only of the movement of said clock in the effect of said condition-controlling means and independent trip mechanism also actuated by said clock for terminating said condition.

4. In controlling apparatus, the combination of an expansible motor element responsive to changes in the condition of a body of fluid, a pair of members between which said motor element is interposed and relatively movable by said element, means controlling body movement of one of said members for stabilizing said condition, a clock and an intermittent toothed gear train driven by said motor during a portion only of its movement for effecting relative movement of said members, thereby to vary said condition.

5. In controlling apparatus, the combination of a capsule expansible by rise of temperature in a body of fluid, a pair of members relatively movable by expansion of said capsule, means actuated by said relative movement for controlling said temperature, a clock, a rotary gear train driven by said clock during a portion only of its movement, and a screw actuated by said train for effecting relative movement of said members, thereby to effect a substantially uniform and gradual change in said temperature during said gear movement.

6. In apparatus for controlling temperature or pressure according to a predetermined program, the combination of means for controlling the condition of a body of fluid, a clock, a rotary gear train actuated by said clock during a portion only of the movement of said clock, a screw driven by said gear train for varying the effect of said condition-controlling means and independent mechanism also actuated by said clock for terminating said condition.

7. In controlling apparatus, the combination of an expansible motor element responsive to changes in the condition of a body of fluid, a pair of members relatively movable by movement of said motor element, means controlled by movement of one of said members for stabilizing said condition, a time-controlled motor, and a gear train driven by said motor during a portion only of its movement for effecting relative movement of said members thereby to vary said condition comprising a rotary gear permanently connected to the element but intermittently connected with the clock.

8. In controlling apparatus the combination of an expansible capsule and means for adjusting said capsule comprising a clock provided with a mutilated gear driven by said clock a gear meshing with said mutilated gear during a portion of the movement of the latter and means drivingly connecting said capsule with said last-named gear.

9. In controlling apparatus the combination of an expansible capsule and means for adjusting said capsule comprising a clock provided with a mutilated gear driven by said clock, a gear meshing with said mutilated gear during a portion of the movement of the latter, and means drivingly connecting said capsule with said last-named gear, said last-named means comprising a screw feed operated by said last-named gear.

10. In controlling apparatus, the combination of a controlling valve, a member for actuating said valve, a second member spaced from said first member and carrying a capsule co-operating with said first member for actuating said valve by expansive movement of said capsule, a screw for effecting substantially bodily movement of said second member towards said first member, a gear for operating said screw, and a clock provided with means driven thereby for actuating said gear during a portion only of the movement of said clock.

11. In controlling apparatus, the combination of a controlling valve, a member for actuating said valve, a second member spaced from said first member and carrying a capsule co-operating with said first member for actuating said valve by expansive movement of said capsule, a screw for effecting substantially bodily movement of said second member towards said first member, a gear for operating said screw, and a clock provided with means driven thereby for actuating said gear during a portion only of the movement of said clock, said last-named means comprising a segmental gear rotated by said clock and intermittently meshing with said screw gear.

12. In an apparatus for regulating the temperature or pressure of a medium over a predetermined period, the combination of a valve for controlling the supply of fluid to said medium, a source of fluid under pressure for actuating said valve, a valve controlling the fluid used for operating said first valve, a latch for controlling said second valve, a clock, a dial driven by said clock and a dog adjustably mounted on said dial for tripping said latch during the movement of the clock.

13. In combination, a cut-off valve for shutting off a fluid supply, a lever for controlling said valve, a latch co-operating with said lever to maintain the same in position to hold said valve in position to permit flow of fluid, a clock, a wheel driven by said clock and provided at its circumference with a circumferentially adjustable block adapted to trip said latch when the clock is running, and means permitting movement of said block past said latch by a reverse movement of said wheel when setting the clock.

14. In combination, a cut-off valve for shutting off a fluid supply, a lever for controlling said valve, a latch co-operating with said lever to maintain the same in position to hold said valve in position to permit flow of fluid, a clock, a wheel driven by said clock and provided at its circumference with a circumferentially adjustable block adapted to trip said latch when the clock is running, and means permitting movement of said block past said latch by a reverse movement of said wheel when setting the clock, said last-named means comprising an auxiliary member movable independently of said latch in one direction only but through which said latch is actuated when the block is moved by the clock.

15. In combination, valve mechanism, a valve-controlling member, a pivoted latch for controlling the position of said lever, a pivoted trip arm adapted to trip said latch when said arm is moved in one direction but adapted to move without actuating said trip when said arm is moved in the other direction, a clock and a trip member driven by said clock for engaging said trip arm to trip said latch at a predetermined point in the running period of said clock.

16. In controlling apparatus, the combination of an expansible motor element responsive to changes in the condition of a body of fluid, a pair of relatively movable members between which said motor element is interposed, means controlled by movement of one of said members for stabilizing said condition, a time-controlled motor, and a toothed gear train including a mutilated gear driven by said motor during a portion only of its movement for effecting relative movement of said members, thereby to vary said condition.

17. In controlling apparatus, the combination of a capsule expansible by rise of temperature in a body of fluid, a pair of relatively movable members between which said capsule is interposed, means controlled by movement of one of said members for controlling said temperature, a clock, and a toothed gear including a mutilated gear driven by said clock during a portion only of its movement for effecting relative movement of said members, thereby to effect a substantially uniform and gradual change in said temperature during said gear-actuated movement.

18. In apparatus for controlling temperature or pressure according to a predetermined program, the combination of means for controlling the condition of a body of fluid, a clock, mechanism including a mutilated gear actuated by the movement of said clock for effecting a positive and gradual change during a portion only of the movement of said clock in the effect of said condition-controlling means and independent mechanism also actuated by said clock for terminating said condition.

19. In controlling apparatus, the combination of an expansible motor element responsive to changes in the condition of a body of fluid, a pair of members between which said motor element is interposed and relatively movable by said element, means controlling body movement of one of said members for stabilizing said condition, a clock, and an intermittent toothed gear train including a mutilated gear driven by said motor during a portion only of its movement for effecting relative movement of said members, thereby to vary said condition.

ALBIN J. NELSON.